(12) United States Patent
Song

(10) Patent No.: US 11,993,466 B2
(45) Date of Patent: May 28, 2024

(54) MATERIAL INTEGRATING DEVICE

(71) Applicant: ZHANGJIAGANG ELEGANT HOME-TECH CO., LTD., Jiangsu (CN)

(72) Inventor: Jincheng Song, Zhangjiagang (CN)

(73) Assignee: Zhangjiagang Elegant Home-Tech Co., Ltd., Jiangsu (CN)

( * ) Notice: Subject to any disclaimer, the term of this patent is extended or adjusted under 35 U.S.C. 154(b) by 879 days.

(21) Appl. No.: 17/044,853

(22) PCT Filed: Nov. 5, 2019

(86) PCT No.: PCT/CN2019/115551
§ 371 (c)(1),
(2) Date: Oct. 1, 2020

(87) PCT Pub. No.: WO2021/031361
PCT Pub. Date: Feb. 25, 2021

(65) Prior Publication Data
US 2022/0348423 A1   Nov. 3, 2022

(30) Foreign Application Priority Data

Aug. 19, 2019 (CN) .................. 201910762857.X

(51) Int. Cl.
*B65G 47/91* (2006.01)
*B65G 47/24* (2006.01)
*B65G 49/06* (2006.01)

(52) U.S. Cl.
CPC .......... *B65G 49/067* (2013.01); *B65G 47/24* (2013.01); *B65G 47/914* (2013.01);
(Continued)

(58) Field of Classification Search
CPC ...... B65G 47/24; B65G 47/91; B65G 47/914; B65G 49/06; B65G 49/064
(Continued)

(56) References Cited

U.S. PATENT DOCUMENTS 5,935,617 A * 8/1999 Uchida ................ A23G 3/2023
425/134
6,841,033 B2 * 1/2005 Condrashoff ..... H01L 21/67069
156/345.31
(Continued)

FOREIGN PATENT DOCUMENTS

| CN | 101382682 A | 3/2009 |
|---|---|---|
| CN | 106695616 A | 5/2017 |

(Continued)

*Primary Examiner* — Douglas A Hess
(74) *Attorney, Agent, or Firm* — Smart & Biggar LP

(57) ABSTRACT

The present invention discloses a material integrating device, which comprises a material transferring mechanism, an integrating mechanism and a conveying mechanism that are linked to a control system signal, wherein the material transferring mechanism is used to place the material to be integrated on the integrating mechanism and transfer the integrated material to the conveying mechanism, a vacuum adsorption platform is installed on a manipulator and is used to adsorb materials; the integrating mechanism comprises a vacuum negative pressure worktable, an angle adjusting platform and an electric push rod, the angle adjusting platform is slidably provided on the top surface of the vacuum negative pressure worktable and is located on the side of the material to be integrated, and the electric push rod is used to push the material to be integrated to be level; and the conveying mechanism comprises a conveyor belt for placing the integrated material.

7 Claims, 4 Drawing Sheets

(52) U.S. Cl.
CPC ......... *B65G 49/061* (2013.01); *B65G 49/064* (2013.01); *B65G 2249/04* (2013.01)

(58) Field of Classification Search
USPC ........................................................ 198/401
See application file for complete search history.

(56) References Cited

U.S. PATENT DOCUMENTS

| | | | | |
|---|---|---|---|---|
| 7,128,869 | B2* | 10/2006 | Habisreitinger | B29C 70/467 |
| | | | | 264/102 |
| 8,367,565 | B2* | 2/2013 | Lei | H01L 21/6776 |
| | | | | 414/935 |
| 8,511,458 | B2* | 8/2013 | Setozaki | B65B 43/12 |
| | | | | 493/267 |
| 8,621,831 | B2* | 1/2014 | Moylan | B65B 39/06 |
| | | | | 53/169 |
| 8,790,064 | B2* | 7/2014 | Dorner | B25J 9/0084 |
| | | | | 901/7 |
| 8,861,171 | B2* | 10/2014 | Prahlad | B25J 15/00 |
| | | | | 361/234 |
| 9,242,818 | B2* | 1/2016 | Bando | B65H 3/0816 |
| 11,345,016 | B2* | 5/2022 | Tadayon | B25J 11/0085 |
| 11,752,723 | B2* | 9/2023 | Langen | B65B 59/00 |
| | | | | 493/313 |
| 2021/0221033 | A1* | 7/2021 | Hato et al. | |
| 2021/0284565 | A1* | 9/2021 | Thellier et al. | |
| 2021/0323259 | A1* | 10/2021 | Langen | |

FOREIGN PATENT DOCUMENTS

| | | |
|---|---|---|
| CN | 107234430 A | 10/2017 |
| CN | 209009637 U | 6/2019 |
| JP | 2007210079 A | 8/2007 |
| JP | 20100098125 A | 4/2010 |

* cited by examiner

MATERIAL INTEGRATING DEVICE

This application is a U.S. nationalization under 35 U.S.C. § 371 of International Application No. PCT/CN2019/115551 filed Nov. 5, 2019 entitled MATERIAL INTEGRATING DEVICE, which claims the benefit of priority to Chinese Patent Application No. 201910762857.X filed Aug. 19, 2019 entitled MATERIAL INTEGRATING DEVICE, all the contents of which are herein incorporated by reference into the below DESCRIPTION OF EXAMPLE EMBODIMENTS.

TECHNICAL FIELD

The present invention relates to the technical field of material processing, in particular to a material integrating device.

BACKGROUND

The traditional material integration mostly adopts manual material integration, which has poor uniformity and low working efficiency. At present, there are some special devices for integrating materials, which are used to grasp and integrate materials by manipulators. However, this device is mostly used for the integration of block-shaped or other three-dimensional materials that are easy to be grasped by manipulators, and is not suitable for sheet materials.

In the process of integrated storage or processing of sheet materials, due to the thinness or hardness of the individual materials, the phenomenon of curling or stacking is prone to occur, which in turn affects the subsequent production and processing. In response to this problem in the prior art, a new material integrating device needs to be provided.

SUMMARY

The object of the present invention is to provide a material integrating device to solve the problem in the prior art. The device is suitable for the integration of sheet materials, which can effectively prevent the materials from curling and stacking and can also adjust the angle of the materials according to the integration requirements with the characteristics of high integration accuracy and high working efficiency.

In order to achieve the above object, the present invention provides the following solution. The present invention provides a material integrating device, which comprises a material transferring mechanism, an integrating mechanism and a conveying mechanism that are linked to a control system signal, wherein the material transferring mechanism is used to place the material to be integrated on the integrating mechanism and transfer the integrated material to the conveying mechanism, the material transferring mechanism comprises a manipulator and a vacuum adsorption platform, and the vacuum adsorption platform is installed at the action end of the hand of the manipulator and is used to adsorb the materials to be integrated and the integrated material; the integrating mechanism comprises a vacuum negative pressure worktable, an angle adjusting platform and an electric push rod, the material to be integrated is placed on the vacuum negative pressure worktable, the angle adjusting platform is slidably provided on the top surface of the vacuum negative pressure worktable and is located on the side of the material to be integrated, and the electric push rod is used to push the material to be integrated to be level; the conveying mechanism comprises a conveyor belt for placing the integrated material.

Further, the vacuum adsorption platform comprises a vacuum detector and a plurality of vacuum chucks, the plurality of vacuum chucks are evenly distributed on the bottom surface of the vacuum adsorption platform and are used to adsorb the material tightly, and the vacuum detector is used to detect the pressure value of the vacuum chucks.

Further, the vacuum adsorption platform further comprises a plurality of longitudinal chutes and transverse chutes, the plurality of longitudinal chutes are fixed in parallel on the worktable surface at the bottom of the vacuum adsorption platform at equal intervals, there are corresponding sets of sliders provided in each of the longitudinal chutes, each of the sliders is fixedly connected to one of the transverse chutes, a plurality of sets of the transverse chutes are parallel to each other; and the plurality of vacuum chucks are slidably connected with the transverse chutes.

Further, the vacuum negative pressure worktable comprises a worktable surface and a hollow cavity, the worktable surface for placing the material to be integrated is integrally provided at the top of the hollow cavity, several air holes are evenly opened on the worktable surface, and the hollow cavity is connected to the vacuum pump through a pipeline.

Further, the angle adjusting platform consists of a left angle adjusting platform and a right angle adjusting platform, the sliding range of the left angle adjusting platform is to slide from the left to the right of the vacuum negative pressure worktable, and the sliding range of the right angle adjusting platform is to slide from the right to the left of the vacuum negative pressure worktable.

Further, both sides of the vacuum negative pressure worktable are provided with a first belt drive group and a second belt drive group which drive the left angle adjusting platform and the right angle adjusting platform, respectively; the first belt drive group comprises two sets of driving wheels and driven wheels symmetrically installed at both sides of the vacuum negative pressure worktable, the driving wheels driven by a motor are in transmission connection with the driven wheels through a belt, a vertical support frame is fixedly connected to the belt, the vertical support frames at both sides of the belt are provided symmetrically, the vertical support frames are used to support the left angle adjusting platform to move with the belt; the second belt drive group has a structure which is the same as that of the first belt drive group, and the second belt drive group is used to support and drive the right angle adjusting platform to move.

Further, the left angle adjusting platform is provided with a plurality of rows of first positioning holes inclined at an angle, the right angle adjusting platform is provided with a plurality of rows of second positioning holes inclined at an angle, the inclination angles of the corresponding first positioning holes and second positioning holes are complementary angles; positioning pins are spirally installed in each of the positioning holes, and the positioning pins are used to adjust the inclination angle of the material.

Further, the positioning pin comprises a bolt and a pushing plate, the bolt is screwed into the positioning hole, the bottom of the screw is fixedly connected with the pushing plate for pushing the material; and the pushing plate is provided parallel to the side of the material.

Further, the electric push rod comprises an electric cylinder and a push rod, the push rod is fixedly installed at the top of a piston rod of the electric cylinder, the push rod is perpendicular to the piston rod, and the push rod is provided horizontally along the length of the material.

Compared with the prior art, the present invention has achieved the following technical effects.

The material integrating device in the present invention is mainly suitable for the integration of sheet materials. The material integrating device adopts vacuum adsorption for loading, which can effectively prevent the material from falling and ensure the flatness of the material. The worktable in the integrating mechanism uses vacuum negative pressure so that the material is fit to the worktable to effectively prevent the material from curling and stacking during the integration process; the material integrating device can also adjust the angle of the materials according to the integration requirements of the materials, and the angle adjusting platform can adjust a plurality of materials at an angle range greater than 0° and less than 180°. The material integrating device has the characteristics of high integration accuracy and high working efficiency.

BRIEF DESCRIPTION OF THE DRAWINGS

In order to more clearly explain the embodiments of the present invention be briefly introduced hereinafter. Obviously, the drawings in the following description are only some embodiments of the present invention. Those skilled in the art may obtain other drawings based on these drawings without paying any creative labor.

In the figures, 1 a manipulator; 2 a vacuum adsorption platform; 3 an integrating mechanism; 31 an anchor; 32 a frame; 33 a belt; 34 a vertical support frame; 35 a vacuum negative pressure table; 4 an electric push rod; 41 a motor; 42 an electric cylinder; 43 a vertical plate; 44 a bearing; 45 a guide shaft; 46 a push rod; 47 a spring steel plate; 5 an angle adjusting platform; 51 a positioning hole; 511 a bolt; 512 a pushing plate; 6 a conveying mechanism.

DESCRIPTION OF THE EMBODIMENTS

The technical solutions in the embodiments of the present invention will be described clearly and completely in conjunction with the drawings in the embodiments of the present invention. Obviously, the described embodiments are only a part of the embodiments of the present invention, rather all the embodiments. Based on the embodiments of the present invention, all other embodiments obtained by those skilled in the art without paying any creative labor fall within the protection scope of the present invention.

The object of the present invention is to provide a material integrating device to solve the problem in the prior art. The device is suitable for the integration of sheet materials, which can effectively prevent the materials from curling and stacking and can also adjust the angle of the materials according to the integration requirements with the characteristics of high integration accuracy and high working efficiency.

In order to make the above objects, features and advantages of the present invention more obvious and understandable, the present invention will be further described in detail in conjunction with the accompanying drawings and specific embodiments.

Figure 1:
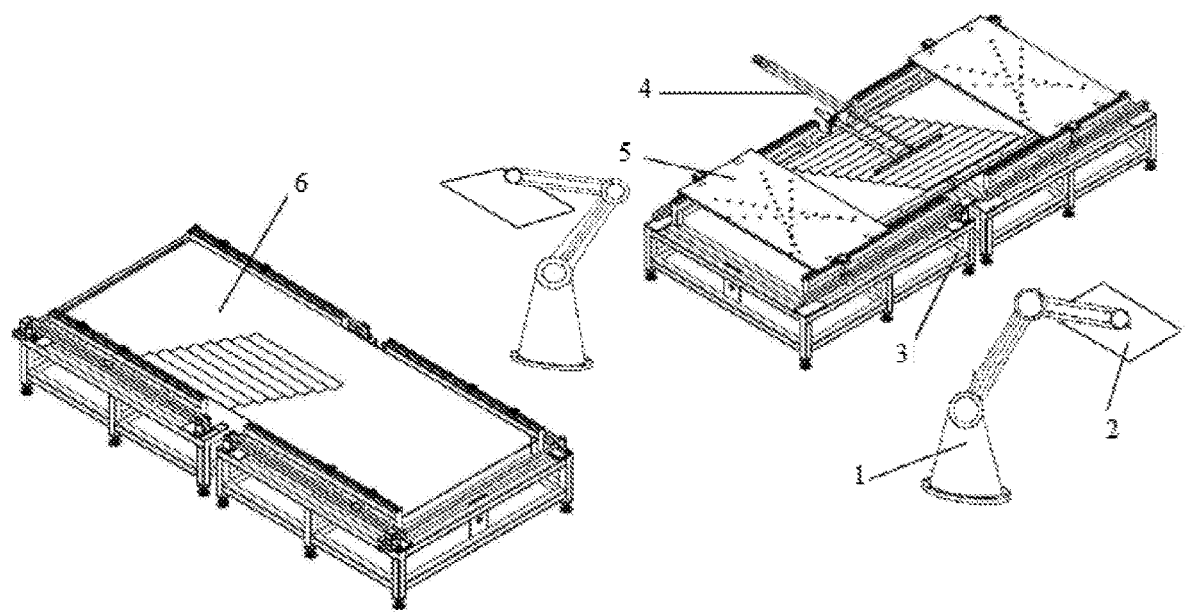
FIG. 1 is a schematic diagram of the overall structure of a material integrating device.
Figure 2:
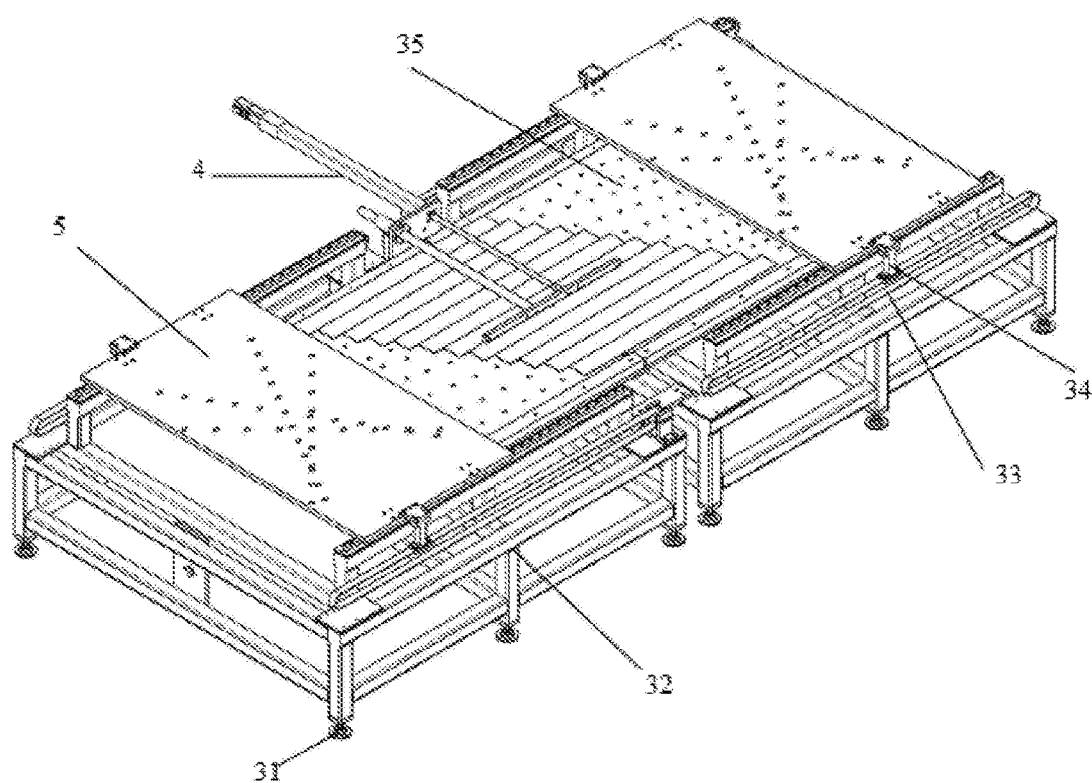
FIG. 2 is an overall schematic diagram of an integrating mechanism.
Figure 3:
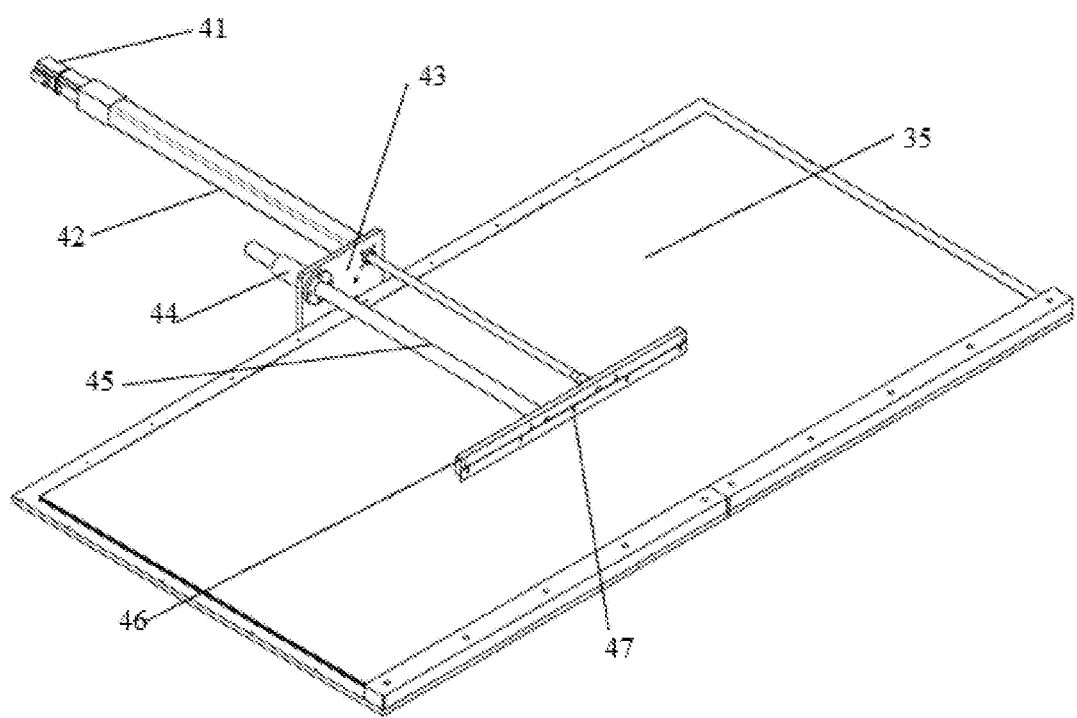
FIG. 3 is an overall schematic diagram of an electric push rod.
Figure 4:
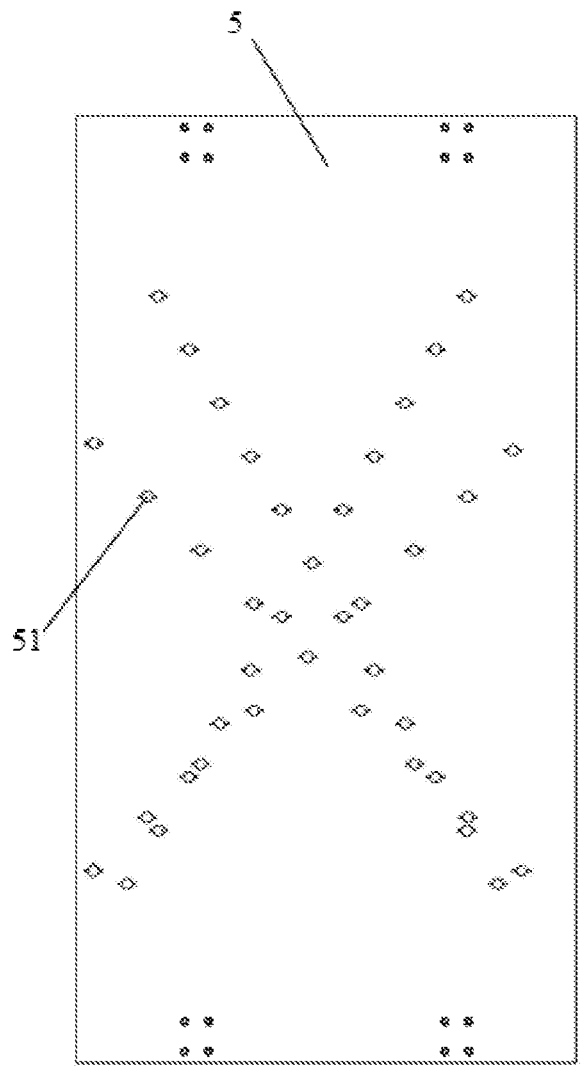
FIG. 4 is a schematic diagram of the structure of an angle adjusting platform.
Figure 5:
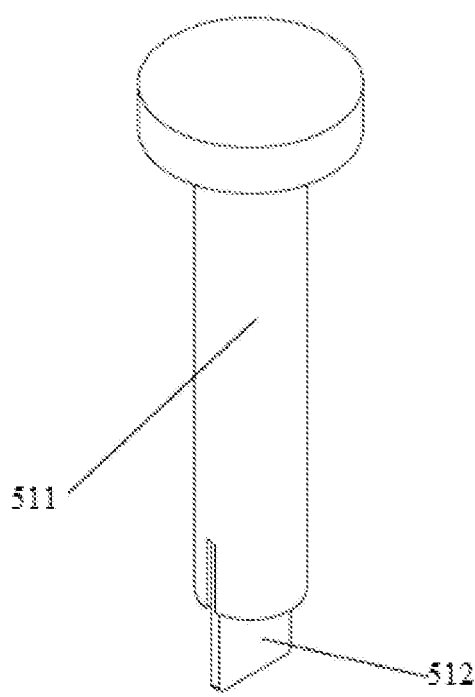
FIG. 5 is a schematic diagram of the structure of a positioning pin.

As shown in FIGS. 1-5, the present invention provides a material integrating device, which comprises a material transferring mechanism, an integrating mechanism 3 and a conveying mechanism 6 that are linked to a control system signal, wherein the material transferring mechanism is used to place the material to be integrated on the integrating mechanism 3 and transfer the integrated material to the conveying mechanism 6.

The material transferring mechanism comprises a manipulator 1 and a vacuum adsorption platform 2, and the vacuum adsorption platform 2 is installed at the action end of the hand of the manipulator 1 and is used to adsorb the materials to be integrated and the integrated material; the integrating mechanism 3 comprises a vacuum negative pressure worktable 35, an angle adjusting platform 5 and an electric push rod 4, the material to be integrated is placed on the vacuum negative pressure worktable 35, the angle adjusting platform 5 is slidably provided on the top surface of the vacuum negative pressure worktable 35 and is located on the side of the material to be integrated, and the electric push rod 4 is used to push the material to be integrated to be level; the conveying mechanism 6 comprises a conveyor belt for placing the integrated material.

The material integrating device is mainly suitable for sheet materials. First, the manipulator 1 aligns the raw materials with rotation. The vacuum adsorption platform 2 installed at the action end of the manipulator 1 is used to adsorb the material and transfer it to the integrating mechanism 3. The vacuum negative pressure worktable 35 in the integrating mechanism 3 can provide vacuum negative pressure, so that the material is adsorbed on the worktable to prevent the material from curling and stacking, and then the material is integrated by the angle adjusting platform 5 and the electric push rod 4. The integrated material is then transferred to the conveying mechanism 6 by the manipulator 1 with the vacuum adsorption platform 2 on the other side for subsequent processing operations.

For sheet materials, the vacuum adsorption loading method can directly absorb the top layer of sheet materials from the top of the stacked raw materials, which will not have the problem of feeding too much or affect the flatness of the lower layer of materials. It is ensured that only the single layer of material to be integrated is absorbed and placed on the vacuum negative pressure worktable 35.

More specifically, the material transferring mechanism in the material integrating device of the present invention comprises the following characteristics.

The vacuum adsorption platform 2 comprises a vacuum detector and a plurality of vacuum chucks. Each vacuum chuck is connected to the vacuuming component through a pipeline. The plurality of vacuum chucks are evenly distributed on the bottom surface of the vacuum adsorption platform 2 and are used to adsorb the material tightly, and the vacuum detector is used to detect the pressure value of the vacuum chucks. The vacuum detector detects the pressure value of the vacuum chucks. After reaching the set pressure value (the suction between the chuck and the material is sufficient), the manipulator 1 acts again to transfer and feed the material. The cooperation between the vacuum detector and the vacuum chuck ensures that there is sufficient suction between the material and the chuck to adsorb up the material, which can prevent the phenomenon of slipping and falling during the process of feeding and transferring the material; the set pressure value of the vacuum detector can also be set in advance according to different suction required by different materials.

The vacuum adsorption platform 2 further comprises a plurality of longitudinal chutes and transverse chutes, the plurality of longitudinal chutes are fixed in parallel on the worktable surface at the bottom of the vacuum adsorption platform 2 at equal intervals, there are corresponding sets of sliders provided in each of the longitudinal chutes, each of the sliders is fixedly connected to one of the transverse chutes, a plurality of sets of the transverse chutes are parallel to each other; and the plurality of vacuum chucks are slidably connected with the transverse chutes. The vacuum adsorption platform can be adapted to adjust the adsorption of raw materials of different specifications and sizes at intervals. The specific operation is as follows: adjusting the position of the corresponding slider of the vacuum chuck in the transverse chute, so that the distance between two adjacent chucks can be adjusted; adjusting the position of the slider at the top of the transverse chute in the longitudinal chute, so that the spacing between two adjacent transverse chutes can be adjusted. The upper and lower positions of the transverse chute and the longitudinal chute are not limited, and the transverse chute can also be provided at the top and the longitudinal chute at the lower part.

The integrating mechanism 3 also comprises the following content.

The vacuum negative pressure worktable 35 comprises a worktable surface and a hollow cavity. The worktable is installed on a frame 32 with an anchor 31. The worktable surface for placing the material to be integrated is integrally provided at the top of the hollow cavity, several air holes are evenly opened on the worktable surface, and the hollow cavity is connected to the vacuum pump through a pipeline. The vacuum pump evacuates the hollow cavity, so that the worktable with air holes is in a vacuum negative pressure state. The material to be integrated is adsorbed on the worktable tightly to ensure that all corners and edges of the material are adsorbed to the worktable.

After the material is adsorbed on the worktable tightly by vacuum negative pressure, the material integration can be carried out. The angle adjusting platform 5 of the material integrating part consists of a left angle adjusting platform and a right angle adjusting platform, the sliding range of the left angle adjusting platform is to slide from the left to the right of the vacuum negative pressure worktable 35, and the sliding range of the right angle adjusting platform is to slide from the right to the left of the vacuum negative pressure worktable 35. The left angle adjusting platform is provided with a plurality of rows of first positioning holes inclined at an angle, the right angle adjusting platform is provided with a plurality of rows of second positioning holes inclined at an angle, the inclination angles of the corresponding first positioning holes and second positioning holes are complementary angles; positioning pins are spirally installed in each of the positioning holes 51, and the positioning pins are used to adjust the inclination angle of the material.

The operating modes of the two angle adjusting platforms 5 are divided into two types.

One operating mode is as follows: the actions of the two angle adjusting platforms 5 are synchronized, the left angle adjusting platform and the right angle adjusting platform move from the left and right sides of the material to be integrated to the material synchronously, the left and right angle adjusting platforms 5 provide two references for adjusting the angle of the material. When the angle adjusting platforms 5 at both sides are in contact with the material, the angle of the material is adjusted in place, and the two angle adjusting platforms 5 stop moving. The overall angle adjusting process is short, the efficiency is high, and the integration accuracy can be improved.

Further, another operating mode is as follows: the two angle adjusting platforms 5 act in different orders, the angle adjusting platform 5 at one side moves first, and there is a time difference in the starting time of the movement of the two angle adjusting platforms 5. After the angle adjusting platform 5 at one side moves into place, one side of the material is integrated and aligned, and then the angle adjusting platform 5 at the other side moves into place again to integrate and align the material again. The two angle adjusting platforms 5 act in sequence to be provided to match with the positioning holes 51 at both sides, which are mutually complementary and inclined, so that there are two references in the process of integrating the material. The angle adjusting table 5 of the previous action and a first inclining positioning hole 1 are used as a preliminary integrating reference, the angle adjusting table 5 of the latter action and a second positioning hole 2 are used as a reference and are integrated accurately (the inclination directions of the first positioning hole 1 and the second positioning hole 2 are the same, the right side of the horizontal direction is taken as the reference, and the inclination angles of the oblique lines where the first positioning hole 1 and the second positioning hole 2 are located are complementary angles to each other), and the angle adjusting platform 5 can adjust a plurality of materials at an angle range greater than 0° and less than 180°, which can effectively reduce the angle tolerance value and improve the integration accuracy.

The above two operating modes of the angle adjusting platform 5 can be appropriately selected according to the needs in the specific production and processing process, and the operating mode is not limited.

The movement of the two angle adjusting platforms 5 is driven by the movement of the belt 33. Specifically, both sides of the vacuum negative pressure worktable 35 are provided with a first belt drive group and a second belt drive group which drive the left angle adjusting platform 5 and the right angle adjusting platform 5, respectively; the first belt drive group comprises two sets of driving wheels and driven wheels symmetrically installed at both sides of the vacuum negative pressure worktable 35, the driving wheels driven by a motor 41 are in transmission connection with the driven wheels through a belt 33, a vertical support frame 34 is fixedly connected to the belt 33, the vertical support frames 34 at both sides of the belt 33 are provided symmetrically, the vertical support frames 34 are used to support the left angle adjusting platform 5 to move with the belt 33; the second belt drive group has a structure which is the same as that of the first belt drive group, and the second belt drive group is used to support and drive the right angle adjusting platform 5 to move. The driving method of the angle adjusting platform 5 is not limited, and other driving methods can be adopted according to actual usage, as long as it can meet the corresponding motion requirements.

The positioning pin comprises a bolt 511 and a pushing plate 512, the bolt 511 is screwed into the positioning hole 51, the bottom of the screw is fixedly connected with the pushing plate 512 for pushing the material; and the pushing plate 512 is provided parallel to the side of the material. The pushing plate 512 pushes the material to move and integrate, and under the premise that the material is adsorbed by the vacuum negative pressure worktable, there will be no curling phenomenon when the material is pushed.

For the integration of materials, first of all, there is gapless assembly. Specifically, the electric push rod 4 comprises an electric cylinder 42 driven by a motor 41, a guide shaft 45, and a push rod 46. The vacuum negative pressure worktable 2 is provided with a vertical plate 43 for supporting and fixing the electric cylinder 42 and the guide shaft 45. The guide shaft 45 is fixed to the vertical plate 43 through the bearing 44, the electric cylinder 42 and the guide shaft 45 are provided in parallel, the ends of the electric cylinder 42 and the guide shaft 45 are fixedly connected with the push rod 46, and a spring steel sheet 47 in contact with the material is installed at the outer side of the push rod 46. The cooperation of the guide shaft 45 and the electric cylinder 42 enables the push rod 46 to horizontally push a plurality of materials to the side of the worktable surface without gaps, and then the angle is adjusted under the premise of zero gap of a plurality of materials.

Taking the long side of the vacuum table as the reference, the electric push rod 4 is used to push the material to fit the reference side, and then the angle adjusting platform 5 is used to adjust the angles at both sides. After the adjustment, the conveying mechanism 6 conveys the material to the subsequent processing platform. The entire operation process of the integrating device is machine operation, which saves a lot of manpower and material resources. While improving working efficiency, it also ensures the accuracy of material integration and has better use and promotion significance.

In the present invention, specific examples are applied to explain the principles and implementations of the present invention. The descriptions of the above embodiments are only used to help understand the method and the core idea of the present invention. At the same time, for those skilled in the art, the idea of the present invention will change in the specific implementation mode and application scope. In summary, the content of the present specification should not be construed as limiting the present invention.

What is claimed is:

1. A material integrating device, which comprises a material transferring mechanism, an integrating mechanism and a conveying mechanism that are linked to a control system signal, wherein the material transferring mechanism is used to place the material to be integrated on the integrating mechanism and transfer the integrated material to the conveying mechanism, the material transferring mechanism comprises a manipulator and a vacuum adsorption platform, and the vacuum adsorption platform is installed at the action end of the hand of the manipulator and is used to adsorb the materials to be integrated and the integrated material;

the integrating mechanism comprises a vacuum negative pressure worktable, an angle adjusting platform and an electric push rod, the material to be integrated is placed on the vacuum negative pressure worktable, the angle adjusting platform is slidably provided on the top surface of the vacuum negative pressure worktable and is located on the side of the material to be integrated, and the electric push rod is used to push the material to be integrated to be level;

the conveying mechanism comprises a conveyor belt for placing the integrated material, wherein the angle adjusting platform consists of a left angle adjusting platform and a right angle adjusting platform, a sliding range of the left angle adjusting platform is to slide from the left to the right of the vacuum negative pressure worktable, and the sliding range of the right angle adjusting platform is to slide from the right to the left of the vacuum negative pressure worktable.

2. The material integrating device according to claim 1, wherein the vacuum adsorption platform comprises a vacuum detector and a plurality of vacuum chucks, the plurality of vacuum chucks are evenly distributed on the bottom surface of the vacuum adsorption platform and are used to adsorb the material tightly, and the vacuum detector is used to detect the pressure value of the vacuum chucks.

3. The material integrating device according to claim 2, wherein the vacuum adsorption platform further comprises a plurality of longitudinal chutes and transverse chutes, the plurality of longitudinal chutes are fixed in parallel on the worktable surface at the bottom of the vacuum adsorption platform at equal intervals, there are corresponding sets of sliders provided in each of the longitudinal chutes, each of the sliders is fixedly connected to one of the transverse chutes, a plurality of sets of the transverse chutes are parallel to each other; and the plurality of vacuum chucks are slidably connected with the transverse chutes.

4. The material integrating device according to claim 1, wherein the vacuum negative pressure worktable comprises a worktable surface and a hollow cavity, the worktable surface for placing the material to be integrated is integrally provided at the top of the hollow cavity, several air holes are evenly opened on the worktable surface, and the hollow cavity is connected to the vacuum pump through a pipeline.

5. The material integrating device according to claim 1, wherein the left angle adjusting platform is provided with a plurality of rows of first positioning holes inclined at an angle, the right angle adjusting platform is provided with a plurality of rows of second positioning holes inclined at an angle, the inclination angles of the corresponding first positioning holes and second positioning holes are complementary angles; positioning pins are spirally installed in each of the positioning holes, and the positioning pins are used to adjust the inclination angle of the material.

6. The material integrating device according to claim 5, wherein the positioning pin comprises a bolt and a pushing plate, the bolt is screwed into the positioning hole, the bottom of the screw is fixedly connected with the pushing plate for pushing the material; and the pushing plate is provided parallel to the side of the material.

7. The material integrating device according to claim 1, wherein the electric push rod comprises an electric cylinder and a push rod, the push rod is fixedly installed at the top of a piston rod of the electric cylinder, the push rod is perpendicular to the piston rod, and the push rod is provided horizontally along the length of the material.

* * * * *